(12) United States Patent
Richards et al.

(10) Patent No.: US 11,454,322 B2
(45) Date of Patent: Sep. 27, 2022

(54) ROTARY PNEUMATIC SEAL FOR A CENTRAL TIRE INFLATION SYSTEM

(71) Applicant: Fairfield Manufacturing Company, Inc., Lafayette, IN (US)

(72) Inventors: Matthew Paul Richards, West Lafayette, IN (US); Coleman Bruce Abbott, West Lafayette, IN (US)

(73) Assignee: Fairfield Manufacturing Company, Inc., Lafayette, IN (US)

( * ) Notice: Subject to any disclaimer, the term of this patent is extended or adjusted under 35 U.S.C. 154(b) by 129 days.

(21) Appl. No.: 16/891,436

(22) Filed: Jun. 3, 2020

(65) Prior Publication Data

US 2020/0386316 A1 Dec. 10, 2020

Related U.S. Application Data

(60) Provisional application No. 62/857,035, filed on Jun. 4, 2019.

(51) Int. Cl.
*F16J 15/3232* (2016.01)
*B60C 23/00* (2006.01)

(52) U.S. Cl.
CPC ..... *F16J 15/3232* (2013.01); *B60C 23/00363* (2020.05)

(58) Field of Classification Search
CPC .... F16J 15/00; F16J 15/16; F16J 15/50; F16J 15/52; F16J 15/3204; F16J 15/3232; F16J 15/3236; B60C 23/003; B60C 23/00363
USPC ....................................................... 277/500
See application file for complete search history.

(56) References Cited

U.S. PATENT DOCUMENTS

| | | | |
|---|---|---|---|
| 1,931,733 | A | 10/1933 | Leibing |
| 5,868,881 | A | 2/1999 | Bradley |
| 6,145,558 | A | 11/2000 | Schmitz |
| 6,325,124 | B1 | 12/2001 | Colussi |
| 6,363,985 | B1 | 4/2002 | Beesley |
| 6,412,525 | B1 | 7/2002 | Nienhaus |
| 6,575,269 | B1 | 6/2003 | Skoff |
| 6,668,888 | B1 | 12/2003 | Beesley |
| 6,857,457 | B2 | 2/2005 | Nienhaus |
| 7,090,221 | B2 | 8/2006 | Matsui |
| 7,185,688 | B2 | 3/2007 | Hayes |
| 7,625,127 | B2 | 12/2009 | Foti |
| 7,896,045 | B2 | 3/2011 | Solie |
| 7,931,061 | B2 | 4/2011 | Gonska |
| 7,942,584 | B2 * | 5/2011 | Norimatsu .......... F16C 33/7883 384/544 |
| 8,069,890 | B2 | 12/2011 | Resare |
| 8,327,895 | B2 | 12/2012 | Stech |
| 8,397,774 | B2 | 3/2013 | Gonska |

(Continued)

*Primary Examiner* — Nathan Cumar
(74) *Attorney, Agent, or Firm* — Marshall & Melhorn, LLC

(57) ABSTRACT

A rotary pneumatic seal may have a ring-shaped inner radial seal with an inner lip extending in an axial direction, an outer lip extending in the same axial direction, a connecting flange connecting the inner lip and the outer lip, a pneumatic sealing lip, and an oil sealing lip. The rotary pneumatic seal may also have a ring-shaped outer radial seal located radially outward from the inner radial seal. The outer radial seal may also have a first wall extending in an outward radial direction, a second wall extending in an opposite inward radial direction, a central flange connecting the first and second walls, and a dust lip.

16 Claims, 2 Drawing Sheets

(56) References Cited

U.S. PATENT DOCUMENTS

| | | | |
|---|---|---|---|
| 8,746,305 B2 | 6/2014 | Lloyd | |
| 8,757,232 B2 | 6/2014 | Weibezahn | |
| 8,783,314 B2 | 7/2014 | Tigges | |
| 8,869,850 B2 | 10/2014 | Stech | |
| 9,078,632 B2 | 7/2015 | Ginn | |
| 9,162,539 B2 | 10/2015 | Hibbler | |
| 9,446,637 B2 * | 9/2016 | Knapke | B60C 23/0039 |
| 9,481,213 B2 | 11/2016 | Keeney | |
| 9,499,015 B2 | 11/2016 | Bittlingmaier | |
| 9,511,635 B2 | 12/2016 | Berkness | |
| 9,539,865 B2 | 1/2017 | Lakin | |
| 9,604,509 B2 | 3/2017 | Tsiberidis | |
| 9,784,370 B2 | 10/2017 | Thomas | |
| 9,873,295 B2 | 1/2018 | Tsiberidis | |
| 9,908,373 B2 | 3/2018 | Hennig | |
| 9,950,574 B2 | 4/2018 | Berkness | |
| 10,011,150 B2 | 7/2018 | Bonora | |
| 10,059,155 B2 * | 8/2018 | Hoeldrich | B60C 23/003 |
| 10,059,156 B2 | 8/2018 | Knapke | |
| 10,208,801 B1 * | 2/2019 | Wang | F16C 33/7886 |
| 10,559,155 B2 | 2/2020 | Pechinko | |
| 2009/0084481 A1 | 4/2009 | Kalavitz | |
| 2014/0062031 A1 | 3/2014 | Honzek | |
| 2018/0304700 A1 * | 10/2018 | Falls | B60C 23/003 |
| 2019/0009622 A1 | 1/2019 | Buhrke | |
| 2019/0070898 A1 | 3/2019 | Falossi | |
| 2019/0107154 A1 | 4/2019 | Ishida | |

* cited by examiner

ROTARY PNEUMATIC SEAL FOR A CENTRAL TIRE INFLATION SYSTEM

FIELD

The device relates to an embodiment for a rotary pneumatic seal, which may be used with a vehicle central tire inflation system.

BACKGROUND

Central tire inflation systems use a source of pressurized fluid, such as air, in communication with one or more tires of a vehicle. The systems can automatically, or in combination with operator input, control the air pressure in one or more of the tires. In most cases, the systems include a CPU and software to manage the airflow to/from the tires based on CPU and/or user commands. The systems can inflate and/or deflate one or more of the vehicle tires so that the tires are at an ideal pressure for the terrain, load and other conditions experienced by the vehicle.

Known central tire inflation systems are often complex. This complexity extends to almost every component of the systems. These components include seals, which seal air passages of the systems, including passages between moving and stationary components.

The high complexity of the systems and their components leads to increased expense for manufacturing and repair/maintenance. In addition, their complexity provides for additional failure modes. Their complexity can also result in a large size which is disadvantageous particularly at the wheel end where space is often difficult to find. The complexity of the prior art systems can also result in increased weight for a vehicle, which increases fuel consumption.

In view of the disadvantages associated with the prior art central tire inflation systems, it would be advantageous for a system, including its components, to be simple, low cost, reliable, compact and lightweight.

SUMMARY

In one embodiment, a rotary pneumatic seal may have a ring-shaped inner radial seal with an inner lip extending in an axial direction, an outer lip extending in the same axial direction, a connecting flange connecting the inner lip and the outer lip, a pneumatic sealing lip, and an oil sealing lip comprised of a ridge. The rotary pneumatic seal may also have a ring-shaped outer radial seal located radially outward from the inner radial seal. The outer radial seal may have a first wall extending in an outward radial direction, a second wall extending in an opposite inward radial direction, a central flange connecting the first wall and the second wall. The outer radial seal may also have a dust lip extending from the central flange.

In another aspect, the first wall of the outer radial seal and the second wall extend transverse the central flange continuously about the outer radial seal, wherein the first wall has a greater radial length than the second wall.

In another aspect, the dust lip, the central flange and the first wall form a continuous outer radial seal channel about the outer radial seal.

In another aspect, the dust lip tapers as it extends from the central flange, wherein an end surface of the dust lip is axially coplanar with the second wall of the outer radial seal, where the dust lip extends at an angle from a first end portion of the central flange.

In another aspect, the connecting flange extends perpendicularly to the inner and outer lips of the inner radial seal and the central flange of the outer radial seal, but is generally parallel the first and second walls of the outer radial seal.

In another aspect, the pneumatic sealing lip is comprised of a first component that extends transverse the connecting flange and a second component that extends transverse the first component and is parallel the connecting flange for a portion of the length of the connecting flange, and wherein the second component extends in the opposite direction from the oil sealing lip.

In another aspect, the first and second components of the pneumatic sealing lip and the connecting flange form a first inner seal channel, where first inner seal channel extends continuously about the inner radial seal.

In another aspect, the oil sealing lip comprises a ridge formed of two radially inward extending tapered surfaces, wherein the ridge is centered on the inner lip and extends continuously about the inner radial seal.

In another aspect, the inner lip, the outer lip and the connecting flange form a second inner seal channel, wherein the second inner seal channel and the first inner seal channel have openings shifted 90 degrees from one another.

In another aspect, the outer lip is positioned in a radially outwardly concentric position with respect to the inner lip.

In another aspect, the inner radial seal is adapted to be positioned so that the second component of the pneumatic sealing lip is located in direct sealing contact with an outer spindle wall flange of a fixed spindle.

In another aspect, the oil sealing lip is adapted to be positioned so that its ridge is located in direct sealing contact with an oil seal surface of the fixed spindle.

In another aspect, the outer radial seal is adapted to be positioned so that the dust lip is in direct contact with the outer spindle wall flange of the fixed spindle radially outward from where the second component of the inner radial seal contacts the outer spindle wall flange.

In another aspect, the second wall of the outer radial seal is adapted to be located in direct contact with the outer spindle wall flange radially inward from where the dust lip contacts the outer spindle wall flange.

In another aspect, at least a majority of the central flange of the outer radial seal is concentrically aligned in the radial direction with respect to both the inner and outer lips of the inner radial seal.

In another aspect, the central flange has a first end portion and a second end portion, where the first end portion is connected to the second wall and the second end portion is connected to the first wall.

In another aspect, a rotary pneumatic seal may have a ring-shaped inner radial seal having a first pneumatic sealing lip adapted to contact a first wall and an oil sealing lip adapted to contact a second wall. The second wall may extend perpendicular to the first wall. A ring-shaped outer radial seal may be located radially outward from the inner radial seal having a second pneumatic sealing lip adapted to contact the first wall radially above the first pneumatic sealing lip, a dust lip adapted to contact the first wall radially between the first and second pneumatic sealing lips.

In another aspect, the second pneumatic sealing lip and said dust lip may be angled to diverge from one another to form a V-shaped channel between them that extends about the inner radial seal.

In another aspect, a continuous constant width gap may extend between the inner radial seal and the outer radial seal.

In another aspect, the first pneumatic sealing lip and the second pneumatic sealing lip may be angled toward one another.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION OF THE PREFERRED EMBODIMENTS

It is to be understood that the device and processes may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions, directions or other physical characteristics relating to the embodiments disclosed are not to be considered as limiting, unless the claims expressly state otherwise.

Turning now to FIGS. 1-4, one embodiment of a rotary pneumatic seal 10 is depicted. The seal 10 may have an inner radial seal 12 and an outer radial seal 14. The inner radial seal 12 and the outer radial seal 14 may each be one piece, integrally formed and unitary. In the depicted embodiment, the inner radial seal 12 and the outer radial seal 14 are separate components from one another that are not connected but operate together to provide the rotary pneumatic seal 10. The inner radial seal 12 may be located radially inward from the outer radial seal 14 in a concentric fashion where seals 12, 14 are separated from one another by a constant width gap.

Figure 3:
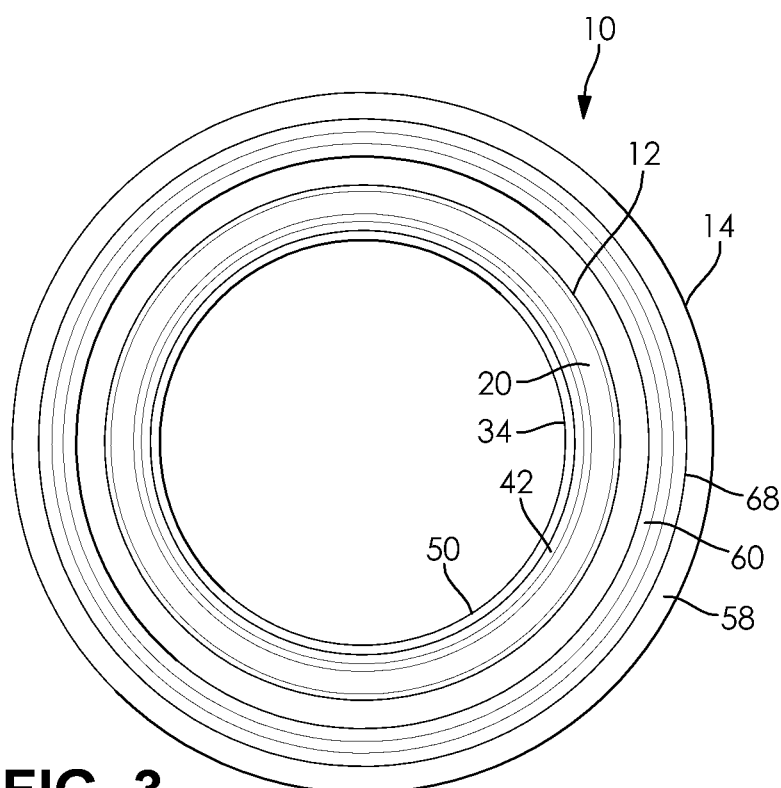
FIG. 3 is a plan view one side of the rotary pneumatic seal.
Figure 4:
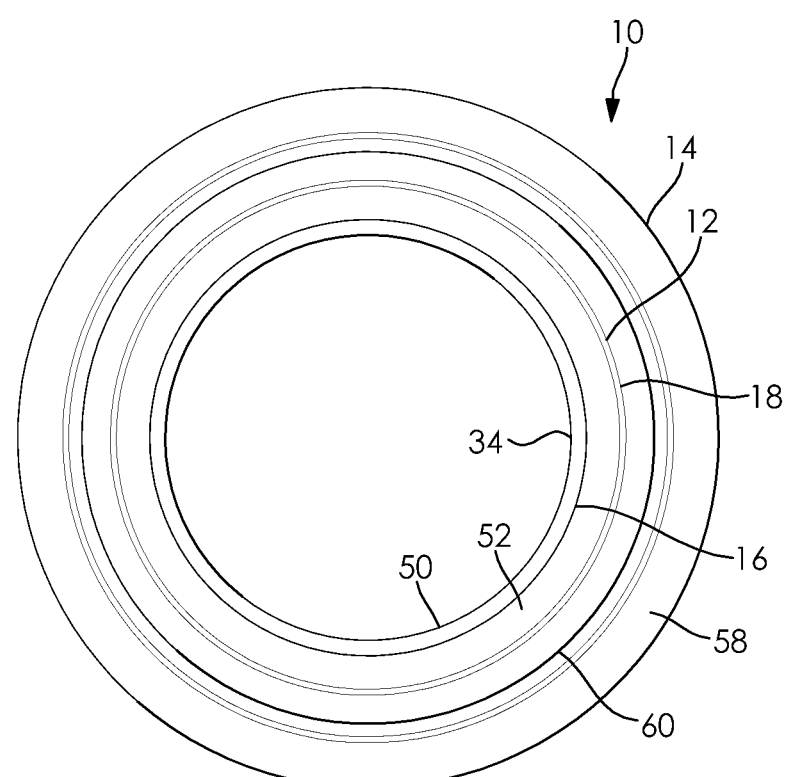
FIG. 4 is a plan view of the opposite side of the rotary pneumatic seal.

As may be appreciated in FIGS. 3 and 4, the inner radial seal 12 and the outer radial seal 14 may each extend in a continuous, uninterrupted fashion each defining a generally circular shape. Further, in some embodiments, the features described below associated with the inner radial seal 12 and the outer radial seal 14 also extend in a continuous, uninterrupted fashion about the seals 12, 14.

The inner radial seal 12 may be comprised of an inner lip 16, an outer lip 18 and a connecting flange 20. The outer lip 18 may be positioned in a radially outward concentric position with respect to the inner lip 16. In the depicted embodiment, the inner lip 16 and the outer lip 18 extend the same length in the same axial direction.

The inner lip 16 may have first and second edge portions 22, 24 with a central portion 26 located therebetween. Similarly, the outer lip 18 may have first and second edge portions 28, 30 with a central portion 32 located therebetween. The outer lip may have a substantially constant thickness.

The connecting flange 20 may connect the inner and outer lip 16, 18. In one embodiment, the connecting flange 20 may connect the first edge portions 22, 28 of both the inner lip 16 and the outer lip 18. Thus, the central portions 26, 32 and the second edge portions 24, 30 of both the outer lip 18 and the inner lip 16 may be cantilevered from the connecting flange 20. Preferably, the connecting flange 20 extends perpendicularly with respect to the inner and outer lips 16, 18. Thus, the connecting flange 20 serves to separate the inner and outer lips 16, 18 with a gap equal to the height of the connecting flange 20.

The inner lip 16 may further define an oil sealing lip 34. The oil sealing lip 34 may be comprised of a ridge 36 integrally formed, unitary and one piece with the inner lip 16. In one embodiment, the ridge 36 may be formed by first and second surfaces 38, 40 that taper radially away from the inner lip 16. Together, the first and second inwardly extending tapered surfaces 38, 40 may form a triangular cross-section, which can be appreciated in FIG. 1. The ridge 36 may be centered on the central portion 32 of the inner lip 16.

The inner radial seal 12 may also have a pneumatic sealing lip 42. The pneumatic sealing lip 42 may be cantilevered off the connecting flange 20. The cantilevered connection may be adjacent to inner lip 16, such as axially opposite the inner lip 16.

The pneumatic sealing lip 42 may be comprised of a first component 44. The first component 44 connects with the connecting flange 20. The first component 44 extends transversely to the connecting flange 20 and extends an axially opposite direction from the inner lip 16. The first component 44 may have a constant thickness and width. At least a portion of the first component 44 may be at least partially coplanar with at least a portion of the inner lip 16.

The pneumatic sealing lip 42 may also be comprised of a second component 46. The second component 46 is connected to an end portion of the first component 44, opposite where the first component 44 connects with the connecting flange 20. The second component 46 may be integrally formed, unitary and one piece with the first component 44.

The second component 46 may extend transverse the first component 44. The second component 46 may also extend parallel the connecting flange 20, but the second component 46 may only be one quarter to one half of the height of the connecting flange 20. The height of the second surface 46 may be constant about the inner radial seal 12. The second component 46 extends in a radial direction opposite the direction of the oil sealing lip 34. The first and second components 38, 40, together with a portion of the connecting flange 20, form a first channel 48 that extends continuously about the inner radial seal 12. The channel 48 may have a constant height and width as it extends about the inner lip 16.

In one embodiment, the inner lip 16, the outer lip 18, the connecting flange 20, the pneumatic sealing lip 42 and the oil sealing lip 34 together form a continuous and uninterrupted ring defining the inner radial seal 12, which can be mostly readily appreciated in FIGS. 3 and 4. The oil sealing lip 34 may define an innermost radial aperture 50 of the inner radial seal 12, as well as for the entire seal 10. The outer lip 18, the inner lip 16 and the connecting flange 20 may generally define a C-shaped cross-section for the inner radial seal 12, which can be seen in FIG. 1.

The outer lip 18, the inner lip 16 and the connecting flange 20 also form a second channel 52 that extends continuously about the inner radial seal 12. The second channel 52 may have a constant height and width as it extends about the inner lip 16. In the depicted embodiment, the first and second channels 48, 52 have openings 54, 56 that are shifted 90 degrees with respect to one another.

The outer radial seal 14 may be comprised of a first wall 58, a second wall 60, and a central flange 62. The first wall 58 may extend in a radially outward direction. The second wall 60 may extend in a radially inward direction. The two walls 58, 60 may extend in opposite radial directions from one another. The two walls 58, 60 may also be parallel to one another but they are axially offset from one another. The first wall 58 may have a greater height than the second wall 60; the first wall 58 may be fifty to one hundred percent taller than the second wall 60.

The first wall 58 and the second wall 60 may extend transverse to the central flange 62. The central flange 62 may have a first end portion 64 and a second end portion 66. In one embodiment, the first end portion 64 is connected to the second wall 60 and the second end portion 66 is connected to the first wall 58. The first wall 58, the second wall 60 and the central flange 62 may be unitary, one-piece and integrally formed. The walls 58, 60 and the central flange 62 may have a uniform thickness.

The first and second walls 58, 60 of the outer radial seal 14 may be parallel to the connecting flange 20. The first wall 58 may extend radially away from the inner radial seal 12 while the second wall 60 may extend radially toward the inner radial seal 12. The central flange 62 of the outer radial seal 14 may be parallel the inner and outer lips 16, 18 of the inner radial seal 12. The second component 46 of the pneumatic sealing lip 42 may extend radially toward the outer radial seal 14. Preferably, the second component 46 is axially and radially aligned with the second wall 60 of the outer radial seal 14.

The outer radial seal 14 may also be comprised of a dust lip 68. In one embodiment, the dust lip 68 extends at an angle from the first end portion 64 of the central flange 62. The angle may be an obtuse angle measured from an outer radial surface 70 of the central flange 62. The dust lip 68 and the first wall 58 might not extend entirely parallel to one another. The dust lip 68 may have an end surface 72 that is coplanar with the second wall 60 although the dust lip 68 extends in a generally opposite direction the second wall 60. The dust lip 68 may taper downwardly in thickness as it extends from the central flange 62. In the depicted embodiment, the dust lip 68 may extend continuously without interruption about the outer radial seal 14. The dust lip 68 and the second wall 60 may form a continuous channel 69 along the outer radial seal 14. The continuous channel 69 may have a V-shaped cross-section.

The dust lip 68, the central flange 62 and the first wall 58 may form a continuous channel 74 that extends about the outer radial seal 14. The dust lip 68 may have a height that this approximately the same as the second wall 60, even though the two are oriented in different directions. The dust lip 68 and the second wall 60 are a fraction of the height of the first wall 58.

The first wall 58, the second wall 60 and the central flange 62 may together form a general S-shaped cross-sectional shape of the outer radial seal 14. The first wall 58, the second wall 60 and the central flange 62 together form a continuous and uninterrupted ring defining the outer seal 14.

Figure 1:
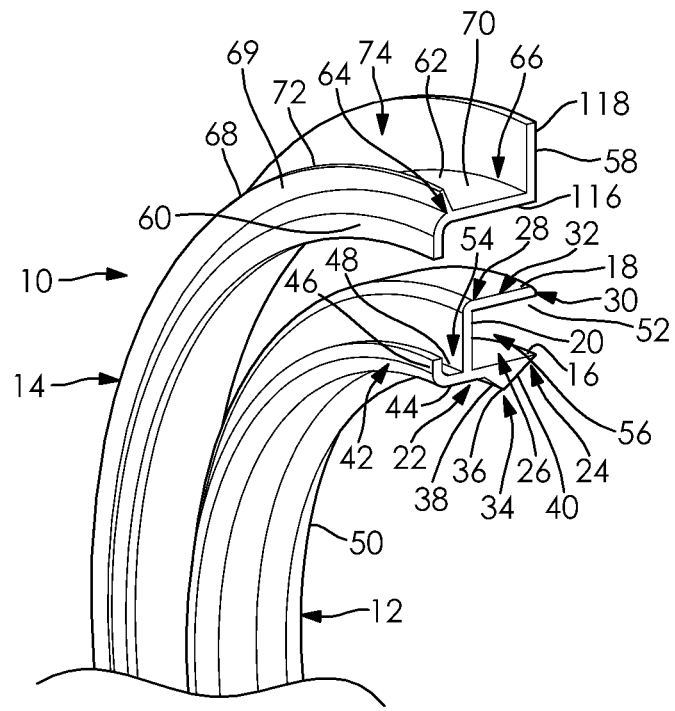
FIG. 1 is schematic, partial, cut-away perspective view of one embodiment of a pneumatic seal.
Figure 2:
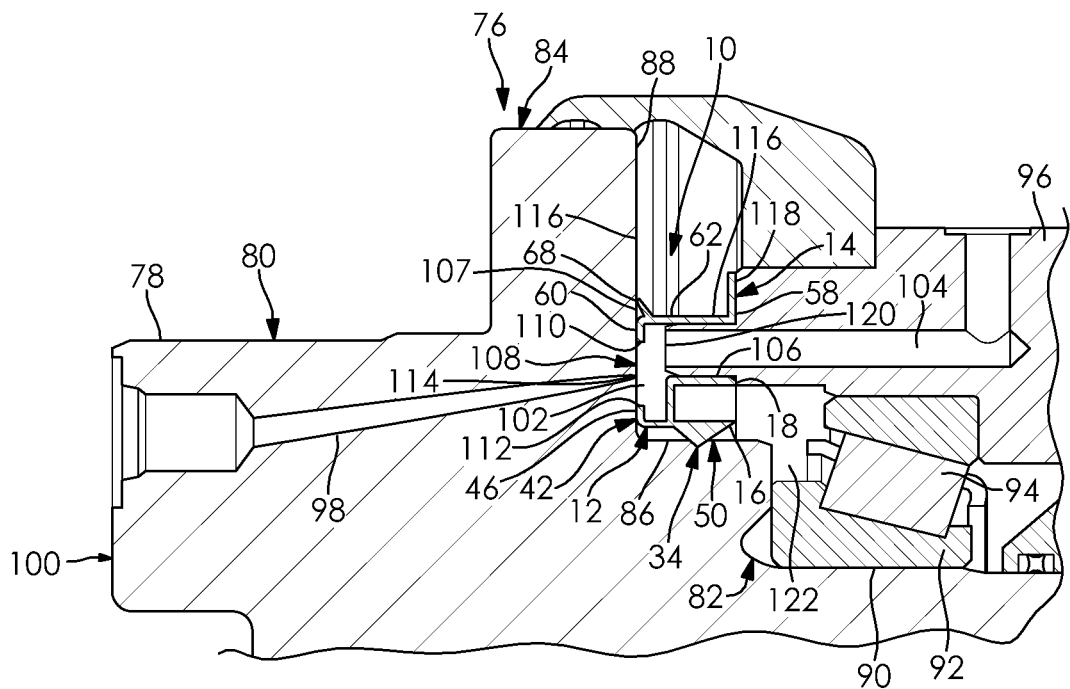
FIG. 2 is a schematic, partial, cut-away side view of a spindle and rotating housing with the rotary pneumatic seal from FIG. 1 located between them.

Turning now to FIG. 2, one embodiment of the rotary pneumatic seal 10 is schematically depicted in a wheel end 76 for a vehicle (not shown), such as a land vehicle. The wheel end 76 may comprise a spindle 78. The spindle 78 may be fixed against rotation, such as being connected to an axle housing (not shown) or the like. The spindle 78 may have an inboard spindle surface 80, an outboard spindle surface 82 and a spindle flange 84 separating the two surfaces 80, 82. The spindle outboard surface 82 may be comprised of a plurality of surfaces of various diameters all of which are less than the outboard spindle surface 82.

One of the outboard spindle surfaces 82 may be an oil seal surface 86. The oil seal surface 86 may be a circumferentially continuous, cylindrical-type surface. The oil seal surface 86 may be located directly adjacent the spindle flange 84. More particularly, an end portion of the oil seal surface 86 may abut a lower, inboard portion of an outer spindle flange wall 88. The outer spindle flange wall 88 may extend transverse the oil seal surface 86. The outer spindle flange wall 88 may be circumferentially continuous about the spindle flange 84. The outer spindle flange wall 88 may be substantially planar.

The next axially adjacent outboard spindle surface 82 to the oil seal surface 86 may be a bearing surface 90. An outer race 92 of one or more bearings 94 of the wheel end may reside on the bearing surface 90. The bearing 94 supports rotational movement of a housing 96 with respect to the fixed spindle 78. The housing 96 may at least partially radially overlap the bearing surface 90 and the oil seal surface 86.

The spindle 78 may comprise a first air channel 98 extending therethrough. The first air channel 98 may be connected to a source of pressurized air (not shown). A two way valve (not shown) may be located between the air source and the wheel end to permit air to flow into and out of a tire (not shown) connected to the housing 96 as needed depending on the conditions.

In the depicted embodiment, the first air channel 98 may extend from an inboard side 100 of the spindle 78 and through the spindle flange 84 to a location where the rotary pneumatic seal 10 is located. More particularly, the first air channel 98 opens on the outer spindle flange wall 88 between the second wall 60 and the second surface 46 of the rotary pneumatic seal 10. The air in the first air channel 98 must span a gap 102 between the fixed spindle 78 and the rotating housing 96. The rotary pneumatic seal 10 assists in spanning the gap 102 from the fixed spindle 78 to the rotating housing 96 by being located in the gap 102. The rotating housing 96 has a second air channel 104 that connects with the gap 102 and seal 10. The second air channel 104 extends through the housing 96 to one or more wheels and tires.

The gap 102 may be defined by and be enclosed in a fluid tight manner by the outer spindle wall flange 88, the rotary pneumatic seal 10 and the housing 96. In one embodiment depicted in FIG. 2, the inner radial seal 12 is positioned so that the second component 46 of the pneumatic sealing lip 42 is located in direct axial outward air tight sealing contact with the outer spindle flange wall 88. Preferably, at least a majority of the second component 46 of the inner radial seal 12 is in direct contact with the outer spindle flange wall 88.

Further, the oil sealing lip 34 of the inner radial seal 12 is positioned so that its ridge 36 is located in direct radial fluid tight contact with the oil seal surface 86 of the spindle 78. Further, the outer lip 18 of the inner radial seal 12 is located in direct air tight sealing contact with an inner radial surface 106 of the housing 96. The inner radial surface 106 is located inboard of the second air channel 104. Preferably, at least a majority of the outer lip 18 of the inner radial seal 12 is located in direct sealing contact with the inner radial surface 106 of the housing 96.

With continued reference to FIG. 2, the outer radial seal 14 is positioned so that the dust lip 68 is in direct contact with the outer spindle flange wall 88 radially outward from where the second wall 60 of the outer radial seal 14 contacts the same wall 88. At least a majority of the second wall 60 of the outer radial seal 14 is also located in direct airtight sealing contact with the outer spindle flange wall 88.

The dust lip 68 and the second wall 60 form a chamber 107 with the outer spindle flange wall 88. The chamber 107 can handle both positive and negative pressures experienced by the seal 10 that result from air flowing into and out of the wheel end 76.

An opening 108 exists between an end 110 of the second wall 60 of the outer radial seal 14 and an end 112 of the second surface 40 of the inner radial seal 12. An air channel outlet 114 from the first air channel 98 in the spindle 78 is centered in the opening 108 and between the two ends 110, 112.

The dust lip 68 prevents contamination into the air gap 102 by blocking or deflecting debris trying to enter the gap 102 from the outside. The second wall 60 of the outer radial seal 14 blocks any debris that happens to get past the dust lip 68. Prevention or reduction in debris results in longer rotary pneumatic seal 10 and wheel end life.

The second wall 60 of the outer radial seal 14 functions as a pneumatic seal against the spindle wall 88. Similarly, the second surface 46 of the inner radial seal 12, being located against the spindle wall 88, also functions as a pneumatic seal. The second surface 46 of the inner radial seal 12 also prevents, or reduces, air pressure in the air gap 102 from negatively acting on the oil sealing lip 34. The oil sealing lip 34 prevents or reduces oil from escaping. Oil, or other lubricant, is located about the bearings 94 to keep them lubricated and cool.

Based on the foregoing, it can be appreciated that the pneumatic seals, comprising the second component 46 and the second wall 60, are located, or aligned, axially with respect to one another. An axially located seal requires much less space than a radial seal, which comprise second component 46 and second wall 60, resulting in a more compact design. In addition, the axially located pneumatic seals, which comprise second component 46 and second wall 60, do not require precision location during assembly compared with radial seals, which results in faster assembly times.

At least a majority of an inner surface 116 of the central flange 62 of the outer radial seal 14 is located in direct air tight sealing contact with the housing 96. Similarly, at least a majority of an outer surface 118 of the first wall 58 of the outer radial seal 14 is located in direct air tight sealing contact with the housing 96. Positioned as described above, at least a portion of the central flange 62 of the outer radial seal 14 is concentrically aligned in the radial direction with respect to both the inner and outer lips 16, 18 of the inner radial seal 12.

A pneumatic chamber 120 is formed between the inner radial seal 12, the outer radial seal 14, the spindle 78 and the wheel end 76. Air from the air source or the tire may flow within the pneumatic chamber 120, thus the chamber 120 may contain both positive and negative pressures.

An oil chamber 122 is formed by the inner radial seal 12, the spindle 78 and the wheel end 76. The oil chamber 122 contains lubricant that cools and lubricates the bearings 94.

In accordance with the provisions of the patent statutes, the device and process has been described in what is considered to represent its preferred embodiments. However, it should be noted that the device and process can be practiced otherwise than as specifically illustrated and described without departing from its spirit or scope.

What is claimed is:

1. A rotary pneumatic seal, comprising:
   a ring-shaped inner radial seal, comprising:
      an inner lip extending in an axial direction;
      an outer lip extending in the same axial direction;
      a connecting flange connecting the inner lip and the outer lip;
      a pneumatic sealing lip; and
      an oil sealing lip comprised of a ridge; and
   a ring-shaped outer radial seal located radially outward from said inner radial seal, comprising:
      a first wall extending in an outward radial direction;
      a second wall extending in an opposite inward radial direction;
   a central flange connecting the first wall and the second wall; and
   a dust lip extending from said central flange.

2. The seal of claim 1, wherein said first wall of said outer radial seal and said second wall extend transverse said central flange continuously about said outer radial seal, wherein said first wall has a greater radial length than said second wall.

3. The seal of claim 1, wherein said dust lip, said central flange and said first wall form a continuous outer radial seal channel about said outer radial seal.

4. The seal of claim 1, wherein said dust lip tapers as it extends from said central flange, wherein an end surface of said dust lip is axially coplanar with said second wall of said outer radial seal and wherein said dust lip extends at an angle from a first end portion of said central flange.

5. The seal of claim 1, wherein said connecting flange extends perpendicularly to the inner and outer lips of the inner radial seal and the central flange of the outer radial seal, but is generally parallel the first and second walls of the outer radial seal.

6. The seal of claim 1, wherein said pneumatic sealing lip is comprised of a first component that extends transverse said connecting flange and a second component that extends transverse said first component and is parallel said connecting flange for a portion of the length of the connecting flange, and wherein said second component extends in the opposite direction from said oil sealing lip.

7. The seal of claim 1, wherein said first and second components of said pneumatic sealing lip and said connecting flange form a first inner seal channel, said first inner seal channel extends continuously about said inner radial seal.

8. The seal of claim 1, wherein said oil sealing lip comprises a ridge formed of two radially inward extending tapered surfaces, wherein said ridge is centered on said inner lip and extends continuously about said inner radial seal.

9. The seal of claim 1, wherein the inner lip, the outer lip and the connecting flange form a second inner seal channel, wherein said second inner seal channel and said first inner seal channel have openings shifted 90 degrees from one another.

10. The seal of claim 1, wherein said outer lip is positioned in a radially outwardly concentric position with respect to the inner lip.

11. The seal of claim 1, wherein said inner radial seal is adapted to be positioned so that a second component of said pneumatic sealing lip is located in direct sealing contact with an outer spindle wall flange of a fixed spindle.

12. The seal of claim 1, wherein the oil sealing lip is adapted to be positioned so that its ridge is located in direct sealing contact with an oil seal surface of a fixed spindle.

13. The seal of claim 11, wherein the outer radial seal is adapted to be positioned so that the dust lip is in direct contact with the outer spindle wall flange of the fixed spindle radially outward from where the second component of the inner radial seal contacts the outer spindle wall flange.

14. The seal of claim 11, wherein the second wall of the outer radial seal is adapted to be located in direct contact with the outer spindle wall flange radially inward from where the dust lip contacts the outer spindle wall flange.

15. The seal of claim 1, wherein at least a majority of the central flange of the outer radial seal is concentrically aligned in the radial direction with respect to both the inner and outer lips of the inner radial seal.

16. The system of claim 1, wherein said central flange has a first end portion and a second end portion, wherein said first end portion is connected to said second wall and said second end portion is connected to said first wall.

* * * * *